United States Patent [19]

Savicki

[11] Patent Number: 4,658,433
[45] Date of Patent: Apr. 14, 1987

[54] RIB AND GROOVE CLOSURE BAG WITH BEAD SEALED SIDES

[75] Inventor: Alan F. Savicki, South Windsor, Conn.

[73] Assignee: First Brands Corporation, Danbury, Conn.

[21] Appl. No.: 774,724

[22] Filed: Sep. 11, 1985

[51] Int. Cl.$^4$ ............................................. B65D 33/24
[52] U.S. Cl. ....................................... 383/63; 383/107; 383/114
[58] Field of Search ................... 383/63, 65, 107, 114, 383/109, 108, 120, 94, 119, 121, 37; 24/587

[56] References Cited

U.S. PATENT DOCUMENTS

| | | | |
|---|---|---|---|
| 2,735,797 | 2/1956 | Schjeldahl | 383/107 X |
| 2,749,020 | 6/1956 | Baxter . | |
| 3,407,077 | 10/1968 | Helin . | |
| 3,416,199 | 12/1968 | Imamura | 383/63 X |
| 3,454,211 | 7/1969 | Hoffman | 383/121 X |
| 3,513,052 | 5/1970 | Ariyasu et al. . | |
| 3,574,039 | 4/1971 | Fehr et al. . | |
| 3,684,720 | 8/1972 | Richardson . | |
| 3,847,711 | 11/1974 | Howard . | |
| 4,186,786 | 2/1980 | Kirkpatrick | 383/63 |
| 4,285,105 | 8/1981 | Kirkpatrick | 24/587 X |
| 4,396,449 | 8/1983 | Tumminig . | |
| 4,479,244 | 10/1984 | Ausnit | 383/63 |

Primary Examiner—William Price
Assistant Examiner—Bryon Gehman
Attorney, Agent, or Firm—Gary L. Wamer

[57] ABSTRACT

A side-sealed bag with a closure device. The bag has a peripheral bead seal and an upper flat seal extending inwardly from the bead seal between the top and the closure elements and a lower flat seal extending inwardly from the bead seal between the bottom and the closure elements.

20 Claims, 10 Drawing Figures

RIB AND GROOVE CLOSURE BAG WITH BEAD SEALED SIDES

FIELD OF THE INVENTION

The invention relates to a bag article made from a thermoplastic film. More specifically, the invention relates to a thermoplastic bag that is thermosealed in the lateral edges, particularly bags having occludable closure elements at the opening.

BACKGROUND OF THE INVENTION

In U.S. Pat. No. 2,749,020, Baxter discloses a bag formed from a thermoplastic film with a transversely extending double seam across the bottom portion of the bag. The double seam consists of a flat seam and an adjoining bead seam along the marginal edge of the flat seam. The method used to form the seam involves passing a flattened tube between a pair of reciprocation heating bars that contact the opposite surfaces of the tube to provide a flat seam transverse across the tube. The tube is then cut adjacent to the cut area, after which the severed edges adjacent to the seam are exposed to radiant heat to melt the edges of the seam, to form a double seam along the bottom of the bag.

In U.S. Pat. No. 3,513,052, Kenji Ariyasu et al. disclose a method for forming a plastic film package comprising a sealed section and beads at the end of the sealed section.

In U.S. Pat. No, 3,684,720, Brady discloses a bag article with a double flat seal along the bottom and side edges. The double seal comprises two spaced apart flat seals.

In U.S. Pat. No. 3,574,039. Fehr et al. disclose a film sealing and cutting system comprising a lower support with a resilient back-up member. A separate hold-down member with spaced parallel holding jaws engages the film to press and hold it against the resilient backup member. A sealing bar suspended between the parallel holding jaws has spaced parallel sealing surfaces arranged to come in contact with the film as it is held against the backup member by the hold-down member. A heated cutting ribbon between the spaced sealing surfaces is moved independently of the sealing bar to cut the film. The sealing bar is not independently heated but is heated by radiation from the cutting ribbon, which a flat blade-like structure.

Howard in U.S. Pat. No. 3,847,711 discloses an apparatus for forming a seal along the edge of a bag with a bead seal along the end of the closure element of the bag. The apparatus comprises a single sealing bar and an opposing pressure bar that move toward each other to engage opposite plastic sheet surfaces. The upper pressure bar has a cutting wire fastened to the middle of the pressure bar so that the cutting wire travels with the pressure bar against the heated sealing bar to cut and seal a film between the pressure and seal bars. The pressure bar incorporates a U-shaped channel for straddling and pinching the closure element, such that a pressure differential occurs to cause a plastic flow into the closure element.

The prior art bags are generally adequate for their designated purpose, but for bags for use in extreme environmental conditions, the seals of the prior bags may be too weak, particularly with "microwave" bags. Microwave bags are intended for the freeze storage of food and also for the cooking of the food in a microwave oven. These bags are often side sealed and have recloseable closure elements near the opening. A requirement is that the closures and seals of these bags remain sealed under the extreme environmental conditions of freezing and cooking. Additionally, if the bags are to be used for "boil-in" cooking by immersing a bags containing a foodstuff in boiling water the bags and closures must be designed to contain moderate pressure.

Bags, in general, can be provided with a bead seal formed by using a heated wire, such as disclosed by Tumminia in U.S. Pat. No. 4,396,449. In this system a heated wire cuts and forms a bead seal. A problem with these bags, particularly in microwave bag applications, is the tendency of the side seals near the bag opening to tear apart. Additionally, bead seals are rarely strong enough alone to contain a moderate steam pressure.

Bags may also be made with a flat seal, such as in the above cited U.S. Pat. No. 3,574,039 and 3,847,711. These seals are stronger, but food storage and cooking bags usually incorporate a reclosable interlocking closure device at the opening, which comprises opposing and mating occludable closure elements. Since the construction of the closure elements often results in open areas between the film sheet sections to be sealed, a flat seal across the closure element is often not completely sealed without the use of extra sealing pressure, a separate sealing step, a stomper bar, or a specially constructed sealing bar. Leakage problems are also caused by the distortion of the closure elements at or near the seal which is caused by prior art methods or which crush the closure elements. The distortion may cause leaks by preventing occlusion of the closure elements near the seal.

Thus, an object of the invention is to provide a thermoplastic bag with leak-free seals of superior strength, particularly bags with reclosable closure elements.

SUMMARY OF THE INVENTION

As aspect of the invention is a bag comprising:
(a) two sections of thermoplastic material in overlying relationship, each section having a top edge, a bottom edge joined with the bottom edge of the other section, and two lateral edges spaced between the top edge and bottom edge;
(b) a closure element adjacent to and extending across the entire top edge of each section, with the closure elements of overlying sections constructed and arranged in opposing and occludable relationship;
(c) a peripheral bead seal at the lateral edges completely fusing together the overlying sections and the closure elements;
(d) an upper flat seal fusing together adjacent surfaces of the sections in a portion extending inwardly from said bead seal between the top edges and the uppermost edge of the closure elements; and
(e) a lower flat seal fusing together adjacent surfaces of the sections in a portion extending inwardly from said bead seal between the joined bottom edges and the lowermost edge of the closure elements.

The overlying sections are preferably provided by folding a single sheet or web to provide two overlying sections. The bottom edges of the resulting sections are then joined at the fold formed when the single web was folded. The overlying sections may also be provided by two separate sheets or webs which are sealed together by a bottom seal.

The upper and lower flat seals are preferably embossed with a pattern.

The bag article of the invention is useful as a microwave bag when made of an appropriate thermoplastic material. The combination of the bead seal and the upper and lower flat seals together provide increased strength of the seal to prevent failure of the seal under extreme cold and hot temperatures and and internal pressure. These seals also resist tearing at the opening of the bag as foodstuff and the like are inserted and removed from the bag. Since the bead seal extends the entire length of the bag, there is no leakage at the closure elements. The upper and lower flat seals extend up to the closure elements providing strength against pressure and tearing where the closure elements come to the edge of the bag. The closure elements are not subjected to a crushing force during manufacture, and, therefore, are not distorted. Leaks due to distortion of the closure elements at or near the seal are thereby avoided. It has been found that a bag can be sealed through the closure element mainly by the the bead seal. This eliminates additional sealing steps to form a leak-proof seal at the closure.

The upper and lower flat seals provide strength and a fluid tight sealing action along the lateral edge of the bag. The bead seal at the closure elements is also reinforced by the flat seals extending up to but not through the closure elements. Additional sealing action at the closure elements may also be provided by some fusion of the closure elements near the flat seals. Although the clamp bars forming the flat seal do not crush the closure element, heat therefrom may soften adjacent surfaces of the closure elements in the grooves of the clamp bar working faces sufficient to partially fuse these surfaces together.

In a preferred embodiment of the invention the bag additionally comprises a means for grasping the bag.

DESCRIPTION OF THE INVENTION

Figure 1A:
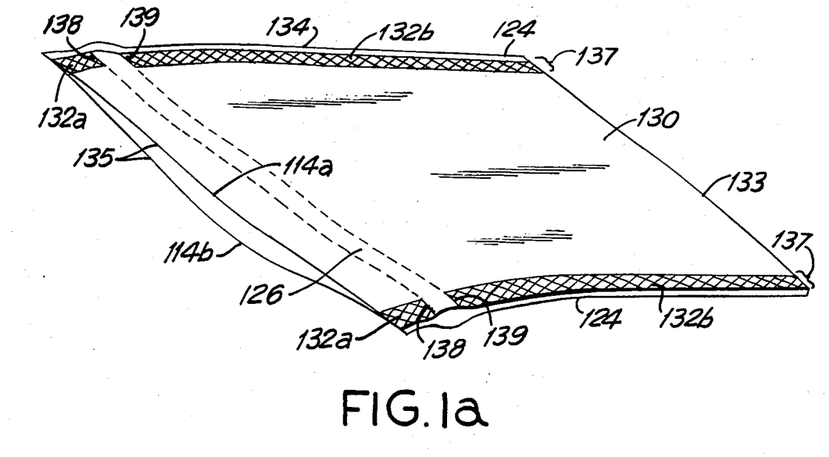
FIGS. 1a, 1b, 1c, and 1d are isometric views of different bag article according to the invention.
Figure 1B:
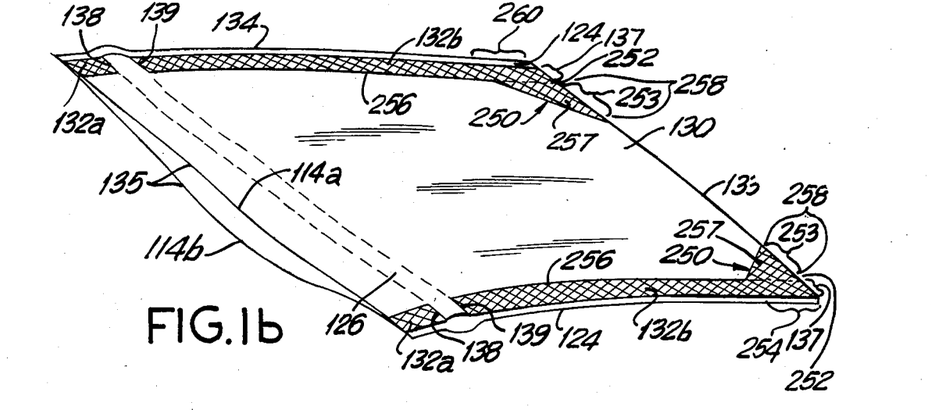
Figure 1C:
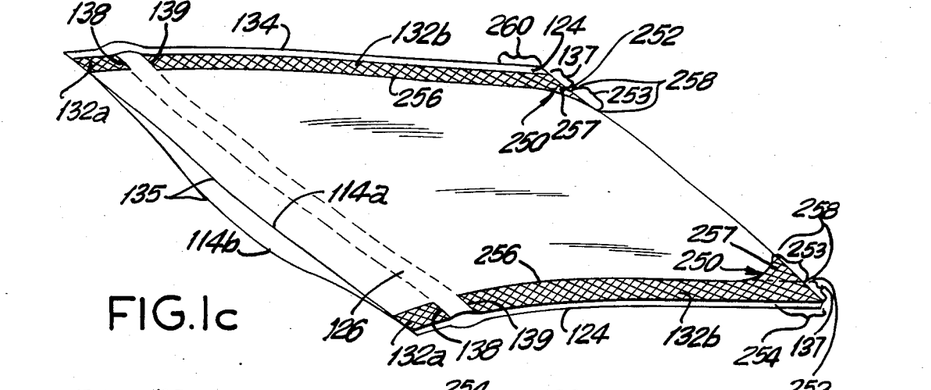
Figure 1D:
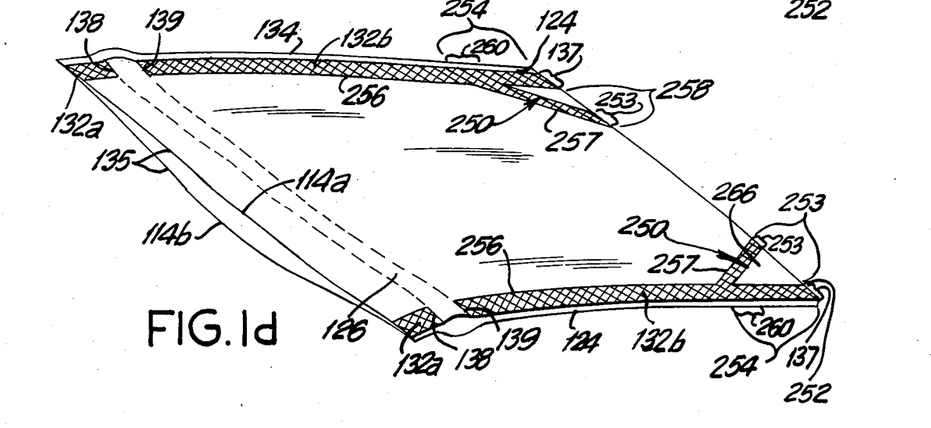
Figure 2:
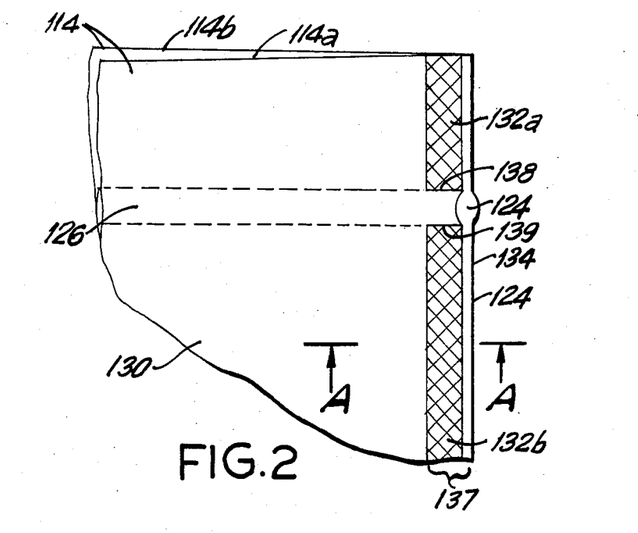
FIG. 2 is an elevational view of a portion of the bag article of FIG. 1a showing the bead seal and upper and lower flat seals in greater detail.
Figure 3:
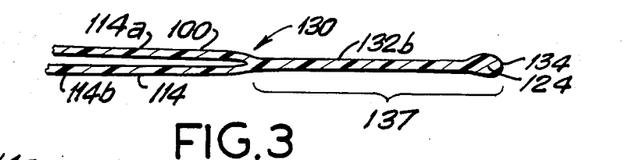
FIG. 3 is a cross-sectional view of a portion of the side of FIG. 2 through line AA.

Referring to FIGS. 1a, 1b, 1c, 1d, 2, and 3, in FIGS. 1a, 1b, 1c, and 1d is shown a bag article 130 according to the invention. In FIG. 2 is shown a detail of the side seals 137 of the bag of FIG. 1. In FIG. 3 is shown the cross-section of the seal of FIG. 2 through line AA. The bag article 130 comprises a web of thermoplastic material folded together near the middle to form opposing sections 114a, 114b. Each section 114a, 114b has a bottom edge 133, two lateral edges 134, and a top edge 135. The bottom edges 133 are joined, preferably as in this embodiment, by a fold.

The sections 114a, 114b include occludable closure elements 126 which are in occludable opposing alignment. The sections 114a, 114b are joined at the lateral edges 134 by side seals 137 on the lateral edges 134. The side seals 137 comprise a bead seal 124, which completely fuses the lateral edges 134 of the film sections 114a, 114b. The side seals 137 also comprise an upper flat seal 132a and a lower flat seal 132b extending inwardly from the bead seal 124 on the lateral edge 134, which fuses the adjacent surfaces of the film sections 114a, 114b together.

The bead seal 124, which is formed by fully melting the lateral edges 134 of the film sections 114a, 114b and which fuses the film sections together, extends entirely along both lateral edges 134. The upper and lower flat seals 132a, 132b are laminations of adjacent surfaces of the film sections 114a, 114b, and extend inwardly from and along the bead seals 124. The upper flat seal 132a extends inwardly from the bead seal 124 between the top edges 135 of the sections and the uppermost edge 138 of the closure elements 126. The lower flat seal 132b extends inwardly from the bead seal 124 between the joined bottom edges 133 and the lowermost edge 139 of the closure elements 126. The upper and lower flat seals 132a, 132b are preferably embossed, as illustrated.

In a preferred embodiment of the invention the bag additionally comprises a means for grasping the bag, so that the bag may be held when the bag contains hot contents. The grasping means may be provided by fluid isolating a portion of the overlying sections from the inner cavity of the bag which contains the hot contents. It is understood that the portion of the overlying sections defined by the top edges, the upper flat seals and the closure elements may function as grasping means. However, as used herein and in the claims, the term "grasping means" refers to additional isolated portions, which are isolated from the inner cavity of the bag, or the cavity bounded by the inner surfaces of the overlying sections 114a, 114b, the joined bottom edges 133, the inner edges of the lower side seals 132b, and the closure elements 126. The inner edges of the lower flat seals 132b are those edges away from the bead seal 124.

Grasping means can be fluid isolated from any portion of the inner cavity as desired, merely by laminating the adjacent surfaces of the overlying sections so as to fluid isolate said portion. It is preferred that the grasping means be positioned at or near the bottom, so that it can be used to hold the bag when emptying the bag.

Referring to FIGS. 1b, 1c, and 1d, it is most preferred that grasping means 250 be on one or both of the lower corners the bag, that is at the juncture 252 of the inner edge 256 of the lower flat seal 132b and the joined bottom edges 133. Preferably the grasping means 250 extends along a portion 253 of the bottom edges 133, along a portion 254 of the inner edge 256 of a lower flat seal 132b, and from the juncture 252 of the said inner edge 256 and the bottom edges 133. Grasping means extending from one or both of the junctures 252 are advantageous in that they can be used to empty the bag of hot contents by inverting the bag. There is also a minimal loss of bag volume. Furthermore, the grasping means 250 at the juncture 252 prevent food from being retained in the corners of the bag after use, which may burn during a subsequent cooking or contaminate new contents. The corner grasping means 250 also eliminate the pointed corners of a bag when filled with liquid. When frozen these pointed corners can be quite sharp and can be subject to damage during handling of the bag. Use of the corner grasping means will generally result, therefore, in a decrease in the incidence of leaks and seal failure at the corners of the bag.

The preferred grasping means 250 can be provided by a grasping seal 257 that extends from a portion 258 of the joined bottom edges 133 of the sections 114a 114b to a portion 260 of the inner edge 256 of one of the lower flat seals 132b. In FIGS. 1b, 1c, and 1d is illustrated this preferred grasping means. In FIGS. 1b, and 1c, the grasping seals 257 also extend to the juncture 252 of the edge of a lower flat seal 132b with the joined bottom edges 133 to provide a grasping means 250 with adjacent surfaces of the sections 114a, 114b completely laminated. In FIG. 1d, the grasping seals 257 do not extend to the juncture 252, providing an unlaminated portion 266 completely isolated from the interior of the bag.

The grasping seals 257 as in FIGS. 1b, 1c, and 1d, can be provided by a separate sealing step, either before, or after the formation of the lower flat 132b and bead seals 124.

The grasping seals 257 as in FIGS. 1b, and 1c can also be provided as an extension of the lower flat seal 132b. This can be provided by appropriate extensions of sealing bars on the apparatus used to form the flat seals 132b. The extension of the lower flat seal 132b is away from the bead seal 124 at the juncture of the inner edge 256 of the lower flat seal 132b and the bottom edges 133, and extends along the bottom edges 133 and along the inner edges 256 of the lower flat seal 132b. The extension of the lower flat seal 132b is preferably generally triangular shaped, as in FIG. 1b, with an angle at the bottom edges of between about 30 and 60 degrees, preferably about 45 degrees. The extension may also be shaped with a rounded edge as in FIG. 1c.

For a bag about 8 inches (20 cm) long and about 7 inches (18 cm) wide, the grasping means should preferably be at one, preferably both of the bottom corners and extend between about 0.7 inches (1.8 cm) to about 1 inch (2.5 cm) from the corner along the bottom and up the sides.

The bag article of the invention may be made by any suitable means known in the art. The flat seals may be formed by a bar seal type apparatus. The bead seal may be formed by cutting and melting back the edges. The formation of the flat seals, the cutting of the film, and the formation of the bead seal may be done either sequentially or simultaneously.

Figure 4:
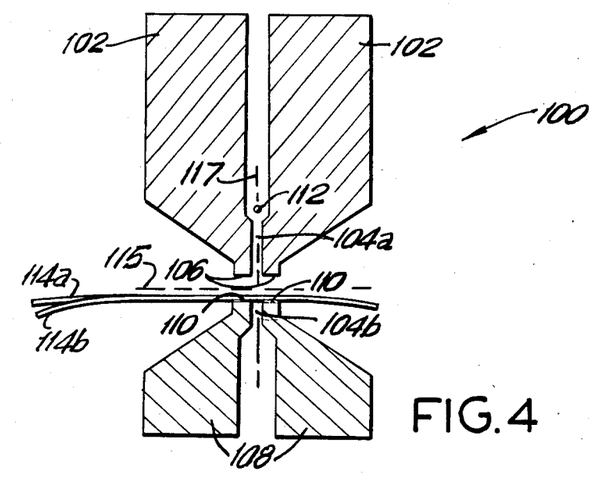
FIG. 4 is an elevational view taken in cross-section of an apparatus suitable for producing the bag article according to the invention.
Figure 5:
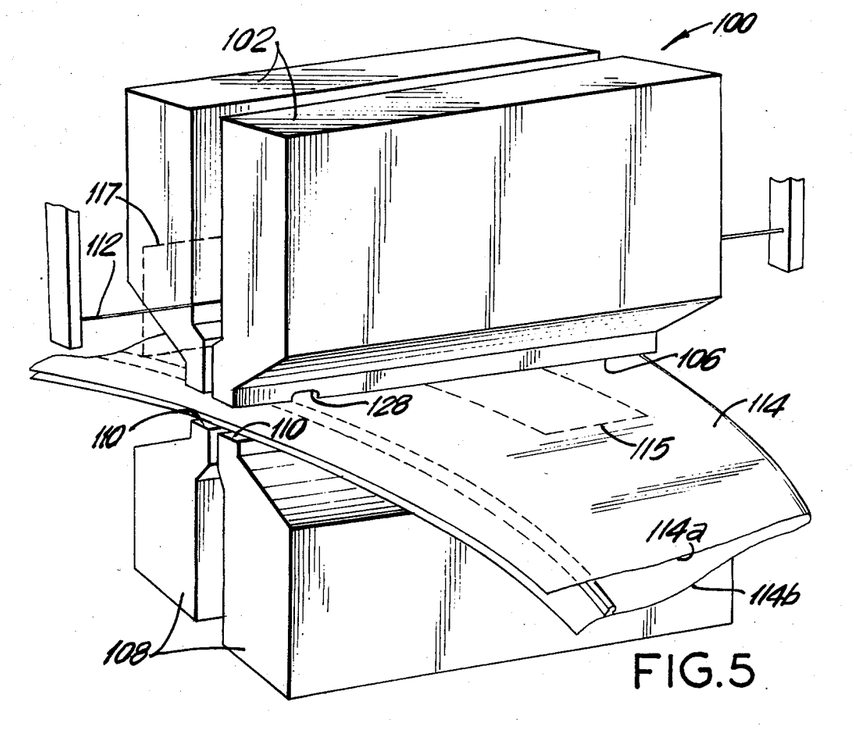
FIG. 5 is an isometric view of the apparatus of FIG. 4, with the clamp bars open and film sections positioned ready to be laminated.
Figure 6:
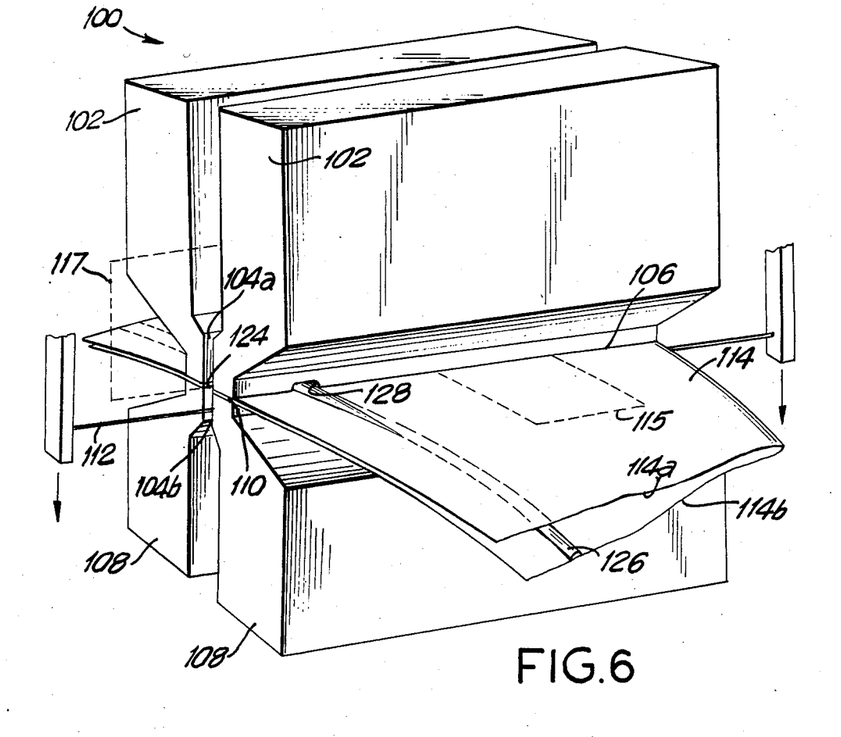
FIG. 6 is an isometric view of the apparatus of FIG. 4 showing the clamp bars in a closed position and the cutting wire after it has passed through the film sections.

In FIGS. 4, 5 and 6 is illustrated a portion of an apparatus 100 suitable for making the bags of the invention. The apparatus 100 comprises an upper pair of clamp bars 102. Each member of the upper pair of clamp bars 102 is in a transversely spaced alignment with each other member of the pair 102, such as to form a longitudinal slot 104a between the upper clamp bars 102. Each upper clamp bar 102 has an upper working face 106.

In a similar manner, a pair of lower clamp bars 108 are provided, with each member of the pair in spaced alignment with the other member to form slot 104b between the lower clamp bars 108. Each of the lower clamp bars 108 has a lower working face 110.

The upper clamp bar 102 pair and the lower clamp bar 108 pair are in a spaced alignment with each other such that the upper working faces 106 are in an opposing and generally parallel vertical alignment to the lower working faces 110, such that and the upper and lower working faces 106, 110 can come into a clamping engagement. The slots 104a, 104b between the upper and lower clamp bars 102, 106 are in transverse alignment so as to form a continuous vertical path between the upper and lower clamp bars 102, 108.

A bead seal cutting wire 112 is supported in a slot 104a, 104b between either the upper clamp bar 102 pair or the lower clamp bar 108 pair.

At least two sections of thermoplastic film 114a, 114b are introduced between the upper and lower working faces 106, 110 by any suitable method. If a bag article is to be produced, the film is typically a single web, folded in the middle to provide two opposing sections 114a, 114b, as illustrated. The film web is preferably folded before introduction between the working faces by any suitable means. There may be a multiplicity of folded webs, or the web may be folded more than once, or there may be additional unfolded webs to provide bags with gussets or additional pockets or chambers. Two or more unfolded webs may also be used, and the bottom sealed in a separate step either before or after the web is cut and the lateral side seals formed.

The alignment of the cutting wire 112 is not critical. The alignment of the cutting wire 112 may be either parallel to or at an acute angle to a first plane 115 parallel to the planes of the working faces 106, 110.

The cutting wire 112 is also aligned to enable vertical movement of the cutting wire 112 in the slots 104a, 104b, preferably the cutting wire 112 is aligned in the slots 104a, 104b between either pair of clamp bars 102, 108 such that the cutting wire 122 is generally aligned along a line within a second plane 117 substantially perpendicular to the first plane 115 and extending through slots 104a, 104b.

The upper and lower working faces 106, 110 of the clamp bar pairs 102, 108 are moved vertically together to clamp the film sections 114a, 114b between the upper and lower working faces 106, 110. Sufficient clamping force is provided to maintain the sections 114a, 114b in vertical alignment between the working faces 106, 110, and to provide sufficient pressure to laminate the adjacent film section surfaces between the working faces 106, 110 together. The working faces 106, 110 are brought together by vertical movement of the upper clamp bars 102, or the lower clamp bars 108, or both the upper and lower clamp bars 102, 108.

The means for vertically moving the clamp bars 102, 108 may be by any suitable means, such as by hydraulic or pneumatic systems, gear drives, cams, electromechanical drives, or any combination of these. Either the upper, or lower, or both of the clamp bar pairs 102, 108 may be moved. Either or both of the clamp bar pairs 102, 108 may incorporate springs that compress when the working faces 106, 110 come together.

The planes of a working face 106, 110 should be generally parallel with the other member of the working face 106, 110 pair. The paired working faces 106, 110 may be coplanar with each other (as illustrated), or a member of a working face pair may be displaced. The displacement should not be sufficient to cause excess stress of the film sections 114a, 114b while clamped across slots 104a, 104b.

The working faces 106, 110 are heated to soften the adjacent film section 114a, 114b surfaces between the upper and lower working faces. The heating is sufficient to seal or laminate the adjacent surface together. The heating should be sufficient only to provide sufficient "tack" to laminate the film surfaces at the pressure applied, and not to melt the film. As is generally known in the art, the laminating pressure and the lamination temperature (or extent of tack) have a generally inverse relationship. The relationship between temperature and lamination pressure will depend on the melt properties of the thermoplastic material of the film sections 114a, 114b.

The working faces 106, 110 are heated by heating either one or both of the clamp bar 102, 108 pairs by any suitable means (not shown) such as by electrical resistance or induction heaters, or heat transfer fluids. Either one or both of the upper or lower clamp bar 102, 108 pairs may be heated.

The cutting wire 112 in operation is moved from its position if the either slot 104a, 104b between one of the clamp bar pairs 102, 108 through the films sections 114a, 114b. Illustrated is the cutting wire 112 in slot 104a between the upper clamp bars 102 (FIG. 5) which is then moved through the film sections 114a, 114b, to slot 104b between the lower clamp bars 108 (as shown by arrows in FIG. 6). The cutting wire 112 is heated to a temperature so as to cut through the film sections 114a, 114b by melting and decomposing the film material. The temperature is also sufficient to melt the film material to form a completely formed bead seal 124 upon the severed edges of the film sections 114a, 114b. The bead seal 124 fuses the film sections 114a, 114b together at the severed edges. FIG. 5 shows the working faces 106, 110 in an unclamped position with the cutting wire 112 positioned above uncut film sections 114a, 114b. FIG. 6 shows the working faces 106, 110 in an engaged position to clamp and seal the film sections 114a, 114b between them, and the cutting wire 112 moved below the film sections to cut and seal the edges of the film sections 114a, 114b.

The means for heating the cutting wire 112 is preferably independent from the heating means of the clamp bars 102, 108 so that the temperatures of the cutting wire 112 and the working faces 106, 110 can be regulated to form a melted fully formed bead seal, and fully laminated flat seals which are not distorted orf melted through.

The cutting wire heating means is provided by any suitable means, preferably by resistance heating of the wire, as described for example in U.S. Pat. No. 4,396,449. The material of the wire may be of any suitable resistance metal with sufficient strength. Preferably the metal is a nickel-chromium alloy. The cross-sectional shape of the cutting wire 112 may be any shape such as circular, wedge shaped, or elongated, preferably flat with the larger dimension vertically aligned.

The width of the slot 104 between the working faces should be sufficient to allow the melted edges of the film sections 114a, 114b to melt back and form a fused fully formed bead seal 124. If the width of the slots 104a, 104b are too narrow, the bead seal 124 has inadequate room to form and metled film material tends to be smeared by the motion of the cutting wire 112. If the width is too wide, the bead seal 124 does not melt back to the edges of the working faces 106, 110 and may be ragged, uneven, and erose. Additionally the width of the slots 104a, 104b and the width and alignment of the cutting wire 112 should be such as to prevent electrical shorting of the wire 112 on the sides of the slots 104a, 104b. The wire 112 should also be tensioned to maintain the straightness of the wire 112.

The means for vertically moving the cutting wire 112 can be provided by any suitable means as described above for the clamp bar 102, 108 moving means. The cutting wire 112 moving means is preferably independent from the moving means of the clamp bars 102, 108, in that the clamp bars 102, 108 are vertically brought together before the cutting wire 112 is vertically moved between the film sections 114a, 114b. However, it is clear that the movement of the clamp bar 102, 108 and the movement of the cutting wire 112 must be coordinated. This can be accomplished by interlocking cams, interlocking gears, timer actuated switches or fluid valves, or any other suitable means. The cutting wire 112 moving means and the clamp bar 102, 108 moving means may also be coordinated by a system of springs or pneumatic cylinders.

The working faces 106, 110 of the clamp bars may be of any suitable material. If the clamp bars 102, 108 are heated, a heat conductive material such as a metal is used for both the clamp bars 102, 108 and the working faces 106, 110. The working faces 106, 110 may also be textured such that the flat seal on the bag article has an embossed pattern. This enhances the visual appearance of the bag article and may provide some strength to the flat seal.

As shown in FIGS. 5 and 6, at least one set of paired grooves 128 are present in at least one pair of the working faces 106, 110. The grooves 128 may be in the upper working faces 106, or the lower working faces 110, or there may be opposing grooves 128 in both working faces 106, 110. There is a groove 128 or a set of paired grooves 128 in each member of a working face pair 106, 110. A groove 128 of a paired set is in transverse alignment to the other member of the groove 128 set. The grooves 128 are thereby so placed so that when two film sections 114a, 114b with occluded closure elements 126 are introduced between the working faces 106, 110 of the upper and lower clamp bars 102, 108, the occluded closure elements 126 are aligned with the grooves 128. When the working faces 106, 110 are moved together to provide a clamping force to maintain the film sections 114a, 114b between them in alignment, the sets of paired grooves 128 correspond with the occluded closure elements 126.

When the sections 114a, 114b are introduced between the working faces 126, the closure elements should be occluded. The grooves 128 are so dimensioned such that there is no clamping force exerted upon the occluded closure elements 126, so that the closure elements 126 are not distorted or crushed as film sections are being clamped together. The flat seals (see discussion of FIGS. 1 and 2 above) are formed by the non-grooved portions of the working faces 106, 110. The flat seals extend along the lateral edges of the bag product, but do not extend through the closure elements 126. The grooves 128 are preferably dimensioned such that the flat seals extend up to the closure elements, such that the grooves 128 fit snugly around the closure elements 126 without crushing or distorting the same. Thus, the upper flat seal 132a and the lower flat seal 132b are formed, as described above in FIGS. 1a, 1b, 1c, 1d, and 2.

In operation, the bead seal cutting wire 112 is moved through the film sections 114a, 114b and the occluded closure elements 126. The cutting wire 112 is heated independently of the working faces 106, 110 such that both the film sections 114a, 114b and the closure elements 126 are severed by melting through the film sections and closure elements. As the film sections 114a, 114b and closure elements 126 are severed a fused fully formed bead seal 124 is formed which fuses the multiple sections 114a, 114b and also fuses the occluded closure elements 126 together at the severed edges. With respect to formation of the bead seal 124 at the closure elements 126, it is preferred that the grooves 128 are dimensioned to tightly tuck the closure elements 126 together, to minimize void spaces between the various parts of the closure elements 126. This will aid in the formation of a leak free bead seal 124 at the severed edges of the closure elements 126.

During the sealing operation, heat from the grooved working faces 106, 110 and the cutting wire 112 may to some extent soften the material of the closure elements 126. Additionally, material melted during formation of the bead seal 124 may flow from the bead seal 124 into the closure elements 126 clamped between the working faces 106, 110 under the grooves 128. Thus, although the flat seal does not extend through the closure elements 126, the closure elements may be sealed together to some degree near the bead seal by this melted plastic.

The closure elements 126 may be attached to the film sections 114a, 114b by any suitable means, such as coextruding the closure elements 126 and the film section 114a, 114b. The closure elements 126 and film section composite 114a, 114b may also be produced by coextruding the closure elements with a flange and laminating the flange to a film web. With this method, the film section 114a, 114b will be thicker in the region near the closure elements 126 corresponding to the flange, and the working faces 106, 110 should be dimensioned to accommodate the extra thickness. This is to maintain a substantially equal clamping force across non-grooved portions of the working faces 106, 110. Suitable methods for forming film sections 114a, 114b with closure elements 126 are disclosed in U.S. Pat. Nos. 3,532,571, 3,784,432, 4,212,377, 4,263,079, and 4,306,924.

The material of the film sections may be any thermoplastic material used for bags. For a microwave or boil-in bag the film should have a high melting temperature, and for a boil-in bag should have sufficient strength to contain moderate steam pressure within the bag. Examples of films used to form microwave bags are those having a polypropylene based layer corresponding to the inside of the bag. The polypropylene base layer is typically predominately polypropylene (at least 50 weight percent), optionally blended with other thermoplastics. The layer of the film corresponding to the outside of the bag is usually a polyamide layer, such as nylon. A suitable adhesive layer of a modified polypropylene is used to bond the layers together. Preferably the material of the layer corresponding to the inside of the bag has a lower melt temperature than the material of the layer corresponding to the outside of the bag.

Preferred film materials for use in the bags of the invention are disclosed in copending application Ser. No. 774,881, filed on Sept. 11, 1985, entitled "Low Temperature Impact And Puncture Resistant Thermoplastic Films and Bags Therefrom", which application is hereby incorporated by reference. Therein are disclosed films comprising an inner film layer comprising a blend of polypropylene copolymer with between about 5 and about 30 weight percent of a resin modifier, and an outer film comprising a resin material having a higher melting temperature than resin material of the inner layer. The resin modifier is a very low density polyethylene, polybutylene, a copolymer of ethylene-methyl acrylate, polyisobutylene, or a mixture of the above.

Figure 7:
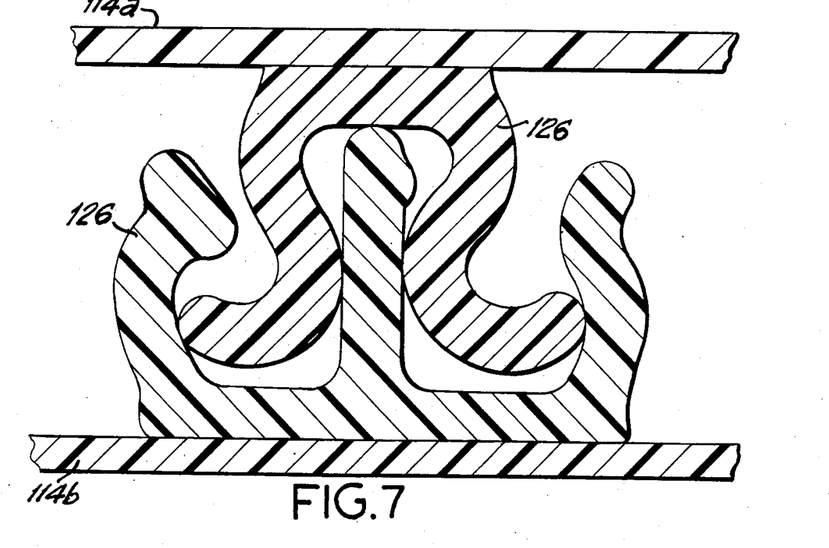
FIG. 7 shows occluded closure elements in cross-section suitable for use on the bag of the invention.

The closure elements may be of any suitably material and of configuration. Suitable closure elements for use in microwave bags typically are made of thermoplastic material that is principally polypropylene. Example of occludable closure elements are disclosed in copending applications Ser. No. 774,997, filed on Sept. 11, 1985, entitled "Trident Interlocking Closure Profile Configuration", and Ser. No. 774,400, filed on Sept. 11, 1985 entitled "Single Hinge Interlocking Closure Profile Configuration", and European Patent Application No. 0130600. These references are hereby incorporated by reference. In FIG. 7 is illustrated the closure element of Ser. No. 774,997, filed on Sept. 11, 1985 in cross-section. Closure elements 126 are attached to sections 114a, 114b, in an occluded relationship.

If it is desired to form grasping means, as previously described, and illustrated in FIGS. 1b, 1c, and 1d. A separate sealing step by conventional methods, either before or after the formation of the upper and lower flat seals and the bead seal, may be provided. Preferably the grasping means is formed by shaped working faces to provide an extended portion of the lower flat seal.

EXAMPLE

An apparatus similar to that described above in FIGS. 4, 5 and 6 was used to manufacture a bag article of the invention. The size of the bag was about 8.5 inches (21.6 cm) along the lateral edges, 7.35 inches (18.7 cm) wide, with a set of occludable closure elements about 0.5 inches (1.3 cm) from the top. The width of the flat seals were about 0.125 inches (3.2 mm). The bag has the general appearance of the bag of FIG. 1a.

The clamp bars 102, 108 were 18¾ inches (47.6 cm) long, for severing and sealing two lanes of film sections simultaneously. The width of the clamping portion of the working faces was sized to form a flat seal 0.125 in. (3.3 mm) wide. Grooves were cut in the upper working faces about 1 inch (2.5 cm), and 10.5 inches (26.7 cm) from the ends. The grooves were 0.125 inches (3.2 mm) high and 0.125 inches (3.2 mm) wide.

The film was a multilayer film with a polypropylene based layer corresponding to the inner surface of the bag, and a nylon polyamide layer corresponding to the outer layer of the bag. The layers were bonded by an adhesive. The thickness of the film was 0.00175 inches (0.045 mm). The film web was about 17 inches (43 cm) wide with opposing closure elements about ½ inch (1.3 cm) from each edge. The web was folded in the middle and the closure elements occluded to provide two thermoplastic sections to be sealed and severed.

The closure elements were coextruded upon a flange which was subsequently laminated to the film. The compositions of the closure elements and flange were principally polypropylene.

The temperature of the wire was about 1200° F. (650° C.), and the temperature of the upper working faces was about 400° F. (180° C.).

Although the present invention has been described in specific detail and by examples, this is not intended to be limitive of the scope of the claims below. Variations not specifically described that are within the spirit of the invention are intended to be included in the scope of the claims.

What is claimed is:
1. A bag comprising;

(a) two film sections of thermoplastic material in overlying relationship, each section having a top edge, a bottom edge joined with the bottom edge of the other section, and two lateral edges spaced between the top edge and bottom edge;

(b) a closure element adjacent to and extending across the entire top edge of each section, with the closure elements of overlying sections constructed and arranged in opposing and occludable relationship;

(c) a peripheral bead seal coextensive with each lateral edge completely fusing together the overlying sections and the closure elements at each lateral edge;

(d) an upper flat seal fusing together adjacent surfaces of the sections in a portion extending inwardly from each bead seal between the top edges of the sections and the uppermost edge of the closure elements; and (e) a lower flat seal fusing together adjacent surfaces of the sections in a portion extending inwardly from each bead seal between the joined bottom edges of the sections and the lowermost edge of the closure elements, such that a flat seal does not extend through the closure elements.

2. The bag of claim 1 wherein the flat seal is embossed with a pattern.

3. The bag of claim 1 wherein the film sections comprise a multilayer film.

4. The bag of claim 3 wherein the multilayer film comprises a first layer corresponding to the inside of the bag, and a second layer corresponding to the outside of the bag, the second layer of material having a higher melt temperature than the first layer.

5. The bag of claim 4 wherein the first layer is at least 50 weight percent polypropylene, and the second layer is a polyamide.

6. The bag of claim 1 wherein the sections are joined by a fold at the bottom edges.

7. The bag of claim 6 wherein the bottom edges are folded inwardly toward the top to form a gusset at the bottom edges.

8. The bag of claim 1 wherein the sections are joined by a seal at the bottom edges.

9. The bag of claim 1 wherein the closure elements and the film sections are coextruded.

10. The bag of claim 1 wherein each closure element is laminated to its respective film section.

11. The bag of claim 1 additionally comprising a means for grasping the bag.

12. The bag of claim 1 additionally comprising a means for grasping the bag which comprises a fluid-isolated portion of the inner cavity of the bag, which inner cavity is defined as the cavity bounded by the inner surfaces of the overlying sections, the closure elements, the joined bottom edges, and the inner edges of the lower flat seals.

13. The bag of claim 12 wherein the grasping means is provided by laminated adjacent surfaces of the overlying sections.

14. The bag of claim 13 wherein the grasping means extends along a portion of the joined bottom edges.

15. The bag of claim 13 wherein the grasping means extends along a portion of the inner edge of a lower flat seal and a portion of the bottom edges, and extends from the juncture of the bottom edges and the inner edge of the flat seal.

16. The bag of claim 1 additionally comprising a grasping seal extending from a portion of the joined bottom edges to a portion of the inner edge away from the bead seal of a lower flat seal.

17. The bag of claim 16 wherein the grasping seal also extends to the juncture of the bottom edges and the inner edge of the flat seal.

18. The bag of claim 17 wherein the grasping seal is an extension of a lower flat seal.

19. The bag of claim 18 wherein there are two grasping seals, each extending to one of the junctures of the bottom edges and the inner edges of the lower flat seals.

20. The bag of claim 1 wherein the joined bottom edges are upfolded into the interior of the bag to provide a bottom gusset.

* * * * *